April 30, 1940.　　　　E. W. OLIVA　　　　2,199,162
MECHANICAL TIRE DISLODGING DEVICE
Filed March 28, 1939　　2 Sheets-Sheet 2
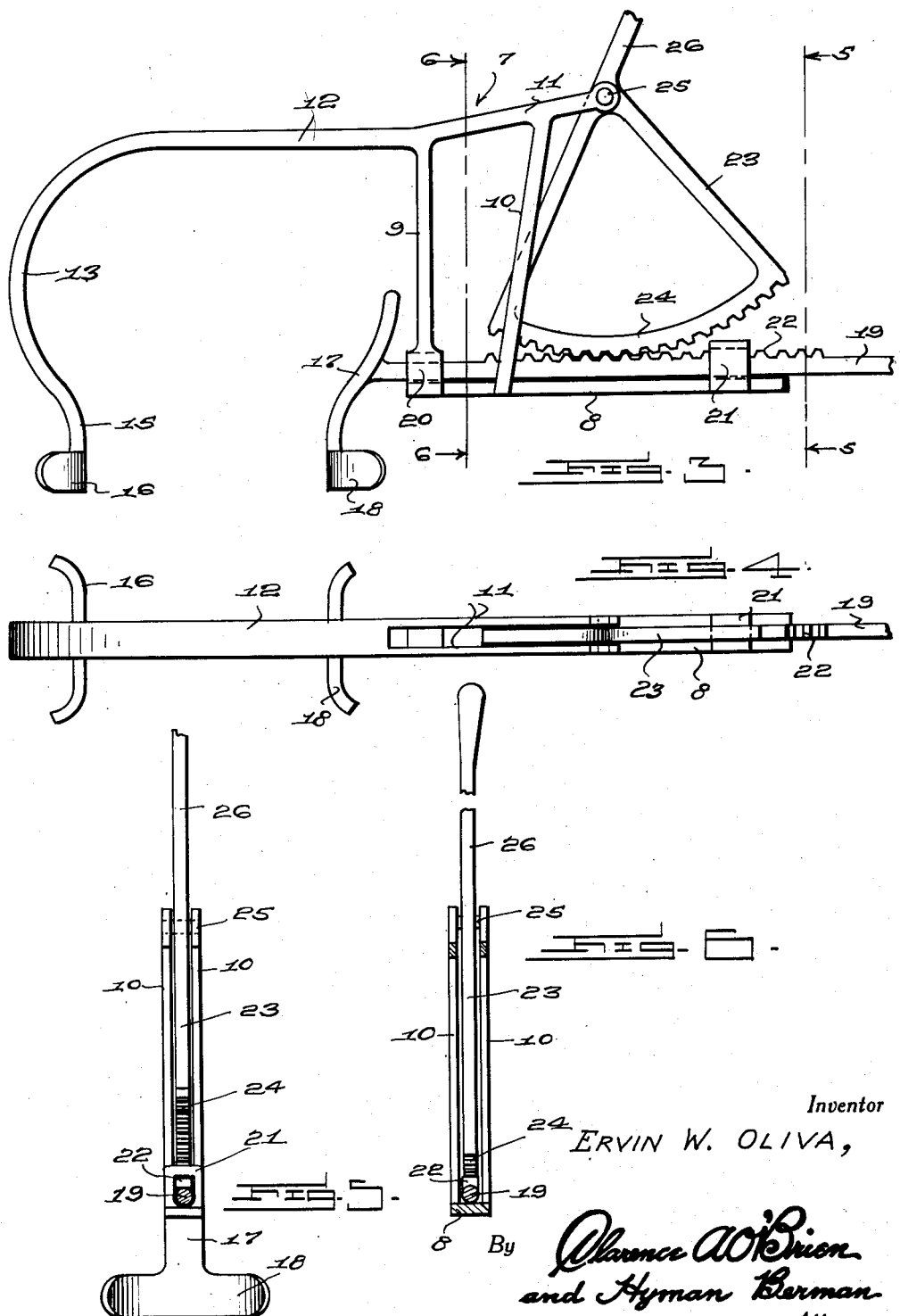
Inventor
ERVIN W. OLIVA,
By Clarence A. O'Brien
and Hyman Berman
Attorneys Patented Apr. 30, 1940

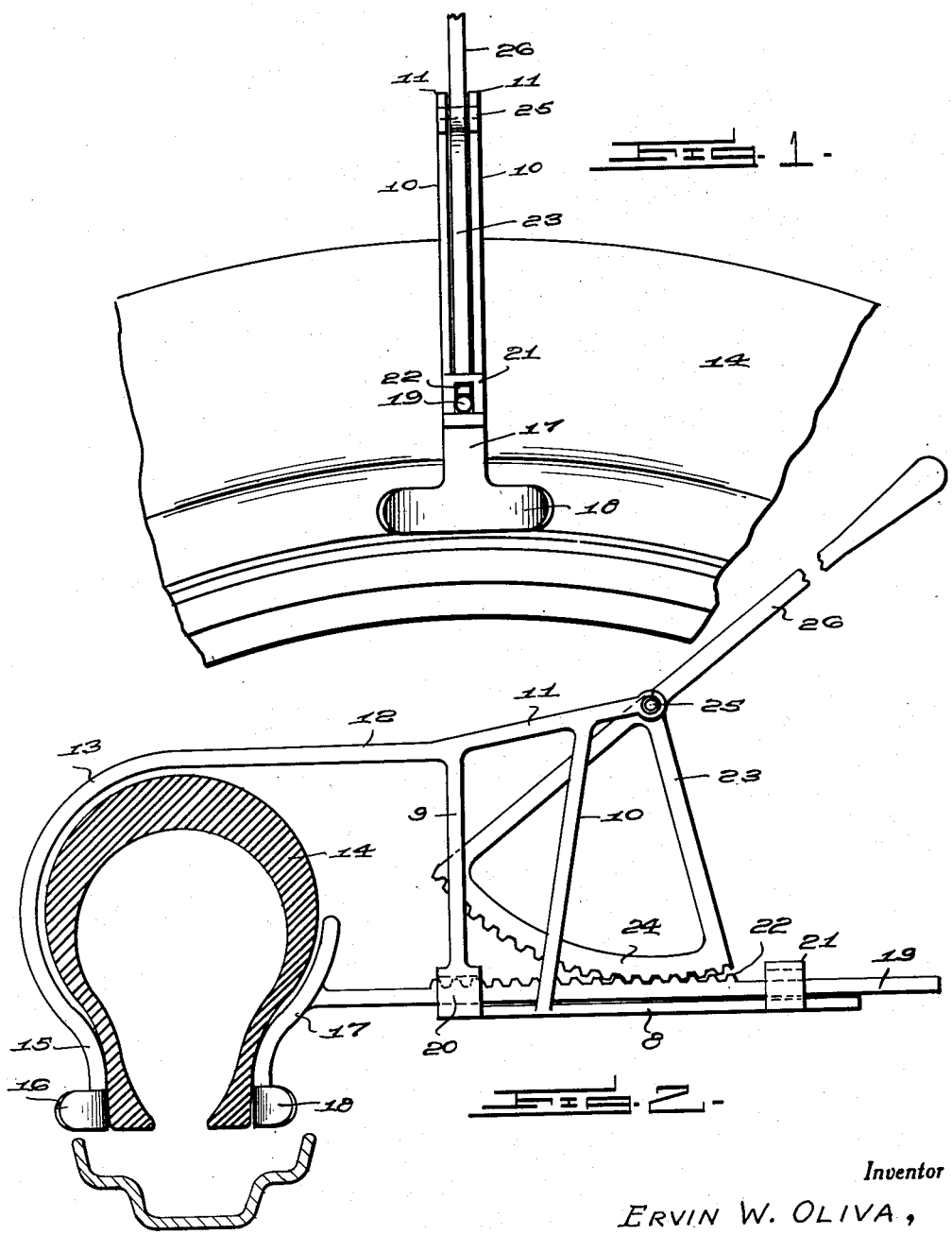

2,199,162

UNITED STATES PATENT OFFICE 2,199,162

MECHANICAL TIRE DISLODGING DEVICE

Ervin W. Oliva, Granger, Tex.

Application March 28, 1939, Serial No. 264,639

1 Claim. (Cl. 157—6)

The present invention relates to a novel mechanical jack structure expressly designed and made to function as a hand operated and controlled implement or device to embrace, contract and dislodge tires from drop center rims.

My principal aim is to provide a structural assemblage whose parts are deftly and aptly chosen and coordinated to make for simplicity, economy and convenience of operation.

Briefly, the preferred embodiment of the invention comprises especially adapted parts intimately conforming to the conventional shape of a pneumatic tire casing, the parts including a relatively stationary jaw and a coordinated movable jaw, the latter being associated with rack and pinion means for positive control and operation.

Other features and advantages will become more readily apparent from the following description and the accompanying illustrative drawings.

In the accompanying drawings, wherein the preferred embodiment of the invention is illustrated and like reference characters are employed to designate like parts throughout the views:

Figure 1 is a side view showing a fragmentary portion of a rim and tire and illustrating the improved tool or implement as used and constructed in accordance with the principles of this invention.

Figure 2 is a view at right angles to Figure 1 detailing the parts to greater advantage.

Figure 3 is a view similar to Figure 2 showing the device disassociated from the tire.

Figure 4 is a top plan or edge elevational view.

Figures 5 and 6 are sections on the lines 5—5 and 6—6 respectively of Figure 1.

Referring now to the drawings by distinguishing reference numerals, it will be observed that 7 denotes a frame. This comprises a horizontal base rod 8 having right angularly disposed parallel braces 9 and 10 adjoined thereto and also adjoined with furcations 11 forming a fork-like extension from a companion reach arm 12. The reach arm 12 terminates in a laterally curvate portion 13 which corresponds in configuration to the adjacent contour of the pneumatic tire casing 14. The free and terminal end portion 15 has a suitably shaped tire wall engaging abutment or adapter element 16. The features 13, 15 and 16 form what may be conveniently called a stationary or thrust receiving jaw. The opposed movable jaw 17 is fashioned into a compound curve and terminates in an abutment or adapter 18 opposed to the part 16. These two parts 15 and 17 engage the beaded portions of the side walls of the tire casing. The jaw member or unit 17 has a cylindrical rod 19 formed integral therewith and extending at right angles therefrom and slidable through guides 20 and 21 integrated with the base bar 8. This operating rod 19 has teeth 22 forming a rack. The guide 20 prevents axial rotation of the operating rod 19.

The rod 19 is actuated through the instrumentality of a triangular frame unit 23, the intermediate arcuate portion of which 24 is formed into a quadrant or gear segment to engage the rack teeth. The apex portion of the triangular unit 23 is pivoted as at 25 between the free ends of the fork fingers or limbs 11. At this point is an integral operating lever 26 equipped with appropriate handle means. It is understood that this is a portable hand style tool or implement. It is so simple, sturdy and possessed of such leverage and mechanical control as to render it adequately serviceable in garages or at home. It is susceptible of easy transportation and therefore can well be adopted as standard equipment for individual ownership. It is capable of use with the wheel off of the car or on the car. That is to say, the jaws are so arranged and shaped as to be susceptible of placement beneath existing type fenders, if necessary, to grapple a difficult to dislodge tire casing. Of utmost simplicity as it is, the method of use and operation seems quite evident. All that is necessary is to engage the jaws with the tire casing as illustrated in Figure 2 and to work the operating lever back and forth to bring into play the rack and segment means.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A manually operated and controlled mechanical tire dislodging device of the class described comprising a main frame unit including a base bar having longitudinally spaced guide eyes rigidly secured thereto, a pair of spaced parallel braces secured to one of said guide eyes and both disposed at right angles to said base bar, a pair of spaced parallel limbs connected to adjacent ends of said braces and cooperating in defining a fork, said fork being at substantial right angles to said braces and approximately parallel to the base bar, a second pair of braces disposed in parallelism with each other, and connected to the limbs of said forks and said base bar, a reach arm embodied in said frame unit, said reach arm being substantially L-shaped in form with its free end portion fashioned to conform to and engage that part of the tire casing which it is intended to embrace, a rack-rod slidable in said guide eyes and slidably contacting said base bar, thrust and tire wall engaging means on the inner end of said rack-rod, an auxiliary frame unit of triangular form, said unit being disposed to work between the respective pairs of said parallel braces, the basal portion of said triangular unit being formed into a gear segment, the teeth thereof meshing with the teeth of said rack-rod, the apex portion of said auxiliary frame unit being pivotally mounted between the free ends of the limbs of said fork, and a lever carried by said auxiliary frame unit.

ERVIN W. OLIVA.